Figure 1:
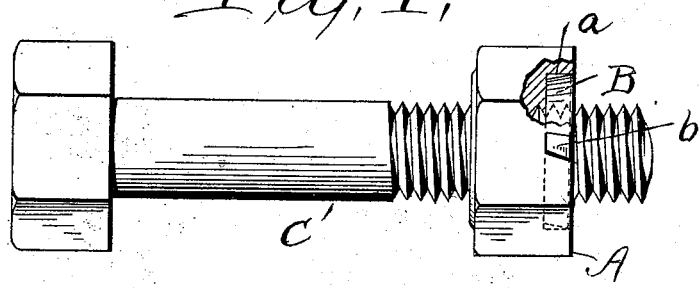

No. 692,572. Patented Feb. 4, 1902.
E. T. WILCOX.
NUT LOCK.
(Application filed Aug. 27, 1901.)
(No Model.)

Witnesses
E. B. Gilchrist
May S. Metzenbaum

Inventor
Edwin T. Wilcox
By Thurston & Bates
his attorneys

UNITED STATES PATENT OFFICE.

EDWIN T. WILCOX, OF BEREA, OHIO.

NUT-LOCK.

SPECIFICATION forming part of Letters Patent No. 692,572, dated February 4, 1902.

Application filed August 27, 1901. Serial No. 73,422. (No model.)

*To all whom it may concern:*

Be it known that I, EDWIN T. WILCOX, a citizen of the United States, residing at Berea, in the county of Cuyahoga and State of Ohio, have invented a certain new and useful Improvement in Nut-Locks, of which the following is a full, clear, and exact description, reference being had to the accompanying drawings.

The invention is designed to absolutely lock a nut to its bolt after it has been screwed to the desired position; and the invention consists in the combination of the bolt and its nut, having in one end an annular recess around the bolt-hole, with a compressible split locking-ring, the periphery of the ring and the wall of the recess in the nut having a taper engagement, so that the ring becomes compressed to clamp the bolt, there being means preventing the relative rotation of the nut and locking-ring.

It also consists in the more specific construction and combination of parts, which are shown in the drawings and described and claimed herein.

Figure 2:
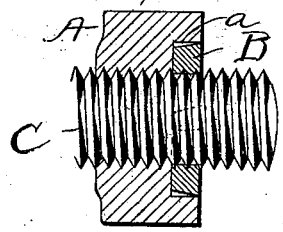
Figure 3:
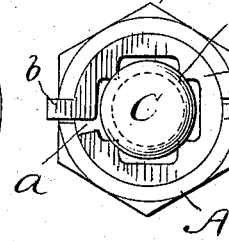
Figure 4:
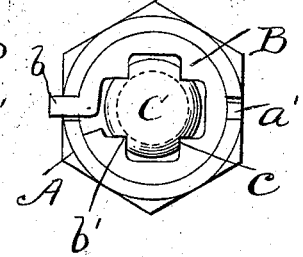
Figure 5:
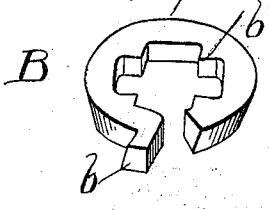
Figure 6:
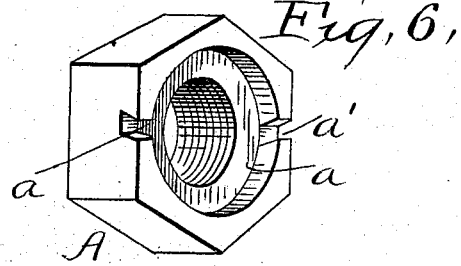
Figure 7:
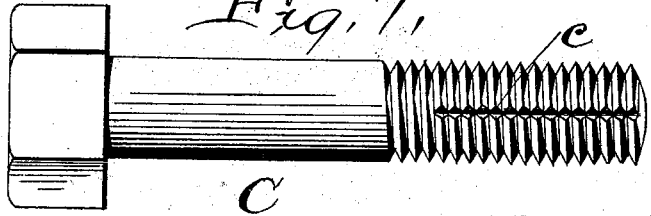

In the drawings, Figure 1 is an elevation showing my invention, a portion of the nut being broken away. Fig. 2 is a view showing nut and locking-ring in section, embracing bolt and locked thereto. Fig. 3 is an end view showing the bolt and nut locked thereto. Fig. 4 is a similar view when the bolt is provided with longitudinal grooves. Fig. 5 is a perspective view of the split locking-ring. Fig. 6 is a perspective view of the nut, and Fig. 7 is an elevation of a grooved bolt as shown in Fig. 4.

Referring to the parts by letters, A represents the nut, and C its bolt. In the outer face of the nut, surrounding and communicating with the threaded bolt-hole, is an annular recess $a$, adapted to receive the split locking ring or key B. This ring is normally of such internal diameter that it may be slipped over the bolt and down to the nut. This ring is externally tapered—that is to say, it is of the form substantially of the frustum of a cone. At its smallest end it will when in its normal condition just enter the recess $a$. As the ring is forced into the recess it will by reason of its tapered exterior be contracted and will grip the said bolt. At one end this locking-ring has an outwardly-extended tongue, which is adapted to enter either of several notches $a'$ in the face of the nut.

In using this invention the nut is screwed onto the bolt to the desired position. The locking-ring is then pushed over the bolt and its small end introduced into the recess $a$, with the tongue $b$ in line with or just entering the most convenient notch $a'$. The ring is now forced down into the recess $a$, preferably by another nut. As the ring is drawn into the said recess it is contracted in diameter. If the ring has, as shown, one or more inwardly-projecting sharp teeth $b'$, they will cut into the bolt-threads, and this makes a positive lock for the nut. If the inner face of the ring is smooth, then the ring will clamp the bolt. In either case the ring cannot turn relatively to the nut because of the engagement of the tongue $b$ in one of the notches $a'$.

In some places it is of no great consequence, comparatively, if the thread of the bolt is mutilated, as it will be, obviously, under certain circumstances above pointed out. This may be avoided by making one or more longitudinal grooves $c$ in the bolt to receive the teeth $b'$. A plurality of notches $a'$ in the nut are most desirable in a construction wherein the bolt is grooved as shown, because the nut need not in such case be turned from its ideal position more than a part of a revolution to bring it to a position where the tongue $b$ and the tooth $b'$ will engage, respectively, with the notch $a'$ in the nut and the groove $c$ in the bolt. A plurality of such notches are, however, useful when the bolt is not grooved. For example if, when the nut is in its desired position, one of the notches $a'$ is in a position where it cannot be conveniently reached, one of the other notches may be utilized to receive the tongue $b$.

To unlock the nut, one must remove the locking-ring, and this may be done by a convenient tool, which may be passed through the notch $a'$ under the ring, which may be then pried up. If the tongue $b$ extends beyond the nut, the removal of the ring may be assisted by striking upward on said projecting tongue.

I claim—

1. The combination of a bolt and its nut having an annular recess in the outer face thereof around the bolt, with a split locking-ring adapted to be forced directly into said recess, and a connection between the nut and said locking-ring preventing their relative rotation, the peripheral wall of said locking-ring and the wall of said annular recess coöperating and one of said walls flaring outwardly away from the threaded portion of the nut and being smooth transversely, substantially as and for the purpose specified.

2. The combination of a bolt, and its nut having an annular recess in its outer face around the bolt-hole and a notch in said outer face, with a split locking-ring having an outwardly-extended tongue adapted, when the ring is forced into said recess, to enter said notch, the periphery of said locking-ring and the wall of said annular recess coöperating and one of them being beveled, substantially as and for the purpose specified.

3. The combination of a bolt, and its nut having an annular recess in its outer face around the bolt-hole, and a notch in said outer face, with a split locking-ring having a tapered periphery, an outwardly-projecting tongue, and one or more inwardly-extended sharp teeth, substantially as and for the purpose specified.

4. The combination of a bolt having one or more longitudinal grooves, and a nut having in its outer face an annular recess around the bolt-hole, and a notch in said outer face, with a split locking-ring having an outwardly-projecting tongue and an inwardly-extending tooth, the periphery of said locking-ring and the wall of said annular recess coöperating and one of them being beveled, substantially as and for the purpose specified.

In testimony whereof I hereunto affix my signature in the presence of two witnesses.

EDWIN T. WILCOX.

Witnesses:
E. L. THURSTON,
E. B. GILCHRIST.